United States Patent [19]

Ellis, Jr. et al.

[11] Patent Number: 4,959,112

[45] Date of Patent: Sep. 25, 1990

[54] SELECTIVE SCRIBING OF MATERIALS

[75] Inventors: Frank B. Ellis, Jr., Princeton; Alan E. Delahdy, Rocky Hill; Jonathan Allen, Titysville; Hermann Volltrauer, Englishtown, all of N.J.

[73] Assignee: Chronar Corp., Lawrenceville, N.J.

[21] Appl. No.: 5,616

[22] Filed: Jan. 21, 1987

Related U.S. Application Data

[63] Continuation-in-part of Ser. No. 671,199, Nov. 14, 1984, abandoned.

[51] Int. Cl.[5] .......... B32B 31/18

[52] U.S. Cl. .......... 156/248; 156/257; 156/267; 156/268; 83/16; 83/171; 83/875; 83/880; 219/78.15; 219/221; 219/229; 219/241

[58] Field of Search .......... 156/248, 250, 267, 268, 156/257, 499, 510, 579, 523; 219/78.15, 118, 229, 230, 233, 234, 235, 236, 237, 241, 243; 83/15, 16, 170, 875, 880

[56] References Cited

U.S. PATENT DOCUMENTS

| | | | |
|---|---|---|---|
| 2,743,348 | 4/1956 | Boyajean | 219/229 |
| 3,538,292 | 11/1970 | Helms et al. | 219/78.15 |
| 3,555,950 | 1/1971 | Gijsbers et al. | 219/229 |
| 3,673,030 | 6/1972 | De La Naulte et al. | 156/268 |
| 4,388,134 | 6/1973 | Long et al. | 156/248 |
| 4,519,864 | 5/1985 | Isobe | 156/268 |
| 4,594,499 | 6/1986 | Rapsey | 83/16 |

*Primary Examiner*—Caleb Weston

*Attorney, Agent, or Firm*—George E. Kersey

[57] ABSTRACT

The invention provides for placing a material to be scribed in a gaseous atmosphere and contacting the surface of the material with a non-cutting heated tip. The heated tip is rounded to prevent cutting and is moved relative to the material. The tip is heated during the scribing operation, either continuously at a prescribed level, or discontinuously in order to maintain the average temperature at a prescribed level.

16 Claims, 2 Drawing Sheets

SELECTIVE SCRIBING OF MATERIALS

BACKGROUND OF THE INVENTION

This is a continuation-in-part of U.S. Pat. Ser. No. 671,199 filed (Nov. 14, 1984. The invention relates to the selective scribing of materials, and, more particularly, to the scribing or patterning of photovoltaic panels.

Modern photovoltaic panels, which convert incident electromagnetic energy into electrical power, desirably have a panel construction in which a glass substrate supports an overlying transparent conductive layer, with a further overlying layer of amorphous silicon and an outer layer of metal such as aluminum. The panel is formed by interconnecting a number of individual cells. The latter are formed on the substrate by the scribing or patterning of the laminar structure at various stages of production. In the final stage, an overall coating of metal, such as aluminum, is applied, and it is necessary to scribe or pattern the aluminum in order to separate the adjoining cells from one another.

Heating that extends to the underlying semiconductor, e.g. silicon, is avoided to prevent damage to the semiconductor. For example, where the underlying semiconductor is hydrogenated amorphous silicon, heating above 200° C. to 300° C. can cause irreparable damage to the semiconductor. Heating of the aluminum can also cause contamination by diffusion of aluminun into the semiconductor.

One standard practice for the scribing of the aluminum to take place in a multi-step process which involves the application of a "resist" or dye, the drying of the resist, the selective removal of the dried resist, and the acid etching of the aluminium surface that is not covered with resist. The last step is to remove the resist. In general these techniques make use of "photo-resist procedures" and/or laser scribing.

Pressure scribing is not employed in order to avoid damage to the underlying layers. Similarly, scribing with cutting edges must be avoided in order to prevent damage to underlying layers of the structure. In addition, the use of a heated cutting edge is objectionable because the cutting edge concentrates the heat and can cause irreparable damage to the underlying silicon. Thus, the scribers of Isobe U.S. Pat. No. 4,519,864; Gijsber et al. U.S. Pat. No. 3,555,950 and Helmes et al. U.S. Pat. No. 3,538,292 are not satisfactory.

Not only are the photo-resist and laser scribing methods time consuming in requiring multi-step operations, they have the further objection of unreliability in part because of the large number of steps in which they are used. In practice, often either the metal is inadequately cut or it is overcut with damage to the other associated layers.

In addition, in ordinary scribing with sharp instruments, it is often necessary to apply significant pressure which can result in shorting to underlying layers.

Accordingly, it is an object of the invention to facilitate the selective scribing of materials. A related object is to facilitate the selective scribing of photovoltaic panels, particularly the outer metallic contact layers that are involved in such panels.

Another object of the invention is to achieve scribing with less complexity and, consequently, less time consumption than is involved with conventional photoresist and laser scribing procedures.

A further object of the invention is to increase the reliability of scribing and avoid the incomplete cuts or overcuts that are frequently associated with photoresist and laser scribing procedures.

Still another object of the invention is to avoid the need for applying "resist" materials, the drying of those materials, and their selective removal in order to achieve desired scribing of materials. An associated object is to eliminate the need for acid etching and final removal of the resist material.

Yet another object is to avoid the adverse consequences of heating during the scribing of materials, particularly by cutting tips in which heating can damage solar panels.

A still further object is to avoid the need for excessive pressure during scribing.

SUMMARY OF THE INVENTION

In accomplishing the foregoing and related objects, the invention provides for placing a material to be scribed in a gaseous atmosphere and contacting the surface of the material with a non-cutting heated tip. The heated tip is rounded to prevent cutting and is moved relative to the material, either by moving the tip or the material in accordance with the pattern that is to be scribed. The tip is heated during the scribing operation, either continuously at a prescribed level, or discontinuously in order to maintain the average temperature at a prescribed level. Discontinuous heating allows the desired average temperature to be realized quickly. It may take the form of successive pulsing. The tip desirably has a longitudinal axis that forms an angle of less than 90° relative to the surface being inscribed.

In accordance with one aspect of the invention, inscription by a heated tip is particularly useful for metals such as aluminum. The tip is heated and maintained at a temperature above the softening point of the material, so that a tip temperature in the range above about 250° C. is desirable for aluminum. In addition, the atmosphere in which the tip operates is controlled according to the result desired. If the material is to be oxidized by scribing, the atmosphere includes oxygen. Conversely, where oxidation is to be prevented, the atmosphere is inert.

In accordance with a further aspect of the invention, the tip has a longitudinal axis which is maintained at an angle of less than 90° in relation to the surface inscribed. A plurality of tips can be employed in order to achieve multiple scribes of the material.

In accordance with yet another aspect of the invention, it is desirable for the tip to be maintained in pressure contact with the surface being inscribed without physical cutting. In the case of aluminum, a suitable pressure is on the order of $10^3$–$10^5$ pounds per square inch.

By heating the tip above the softening point of the materials being inscribed, and by moving the tip rapidly as inscription takes place, the desired incision is assured without the adverse consequences of heat spreading which could damage the material being inscribed.

In accordance with a still further aspect of the invention, any shards of metallic material that remain between adjoining sections that have been scribed, are burned out by applying a voltage to the adjoining sections. The resultant passage of current causes the substantially immediate elimination of the shards and consequently their complete elimination from the scribed structure.

In accordance with still another aspect of the invention, the rounded tip has an included angle between about 25° and 30°. The radius of the tip is initially between about 0.0020 and 0.0025 inches. The initial formed tip is desirably further rounded by abrasion, with, for example, tin dioxide, to a working radius of about 0.0040 inches. This is because of the importance of avoiding a sharp or scratching tip. The two-step procedure permits precision control over the rounding operation.

DESCRIPTION OF THE DRAWINGS

Other aspects of the invention will become apparent after considering several illustrative embodiments, taken in conjunction with the drawings, in which.

DETAILED DESCRIPTION

Figure 1:
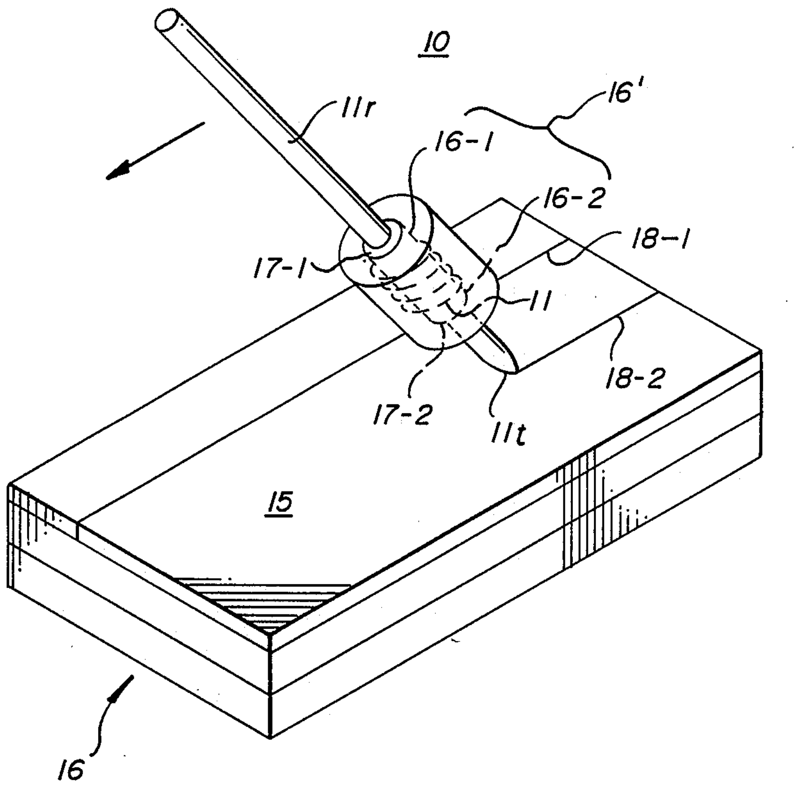
FIG. 1 is a schematic view illustrating a heated scribing tip in accordance with the invention and an associated metallic layer that is being inscribed.

With reference to the drawings, FIG. 1 shows an illustrative patterning device 10 for inscribing the metallic surface 15 of a photovoltaic laminate 16. The device 10 includes a heat source with a rounded conical tip **11*t* that is secured to a rod 11*r*. The tip 11*t* is rounded to make it non-cutting. The holder for the tip 11*t* and the rod 11*r* are of steel. The source 11 includes a heater 16' which is sandwiched between cylindrical insulators 17-1 and 17-2. The leads 16-1 and 16-2 of the heater 16' extend to an electrical power supply (not shown). The insulators 17-1 and 17-2** are desirably of ceramic.

The laminate 16 shown positioned beneath the heated tip **11*t* can be a standard photovoltaic panel in which the individual cells are isolated from one another by inscription, for example along the lines 18-1 and 18-2 shown in FIG. 1. The line 18-1 was completed on a prior pass and the line 18-2** is in the course of being completed.

Figure 2:
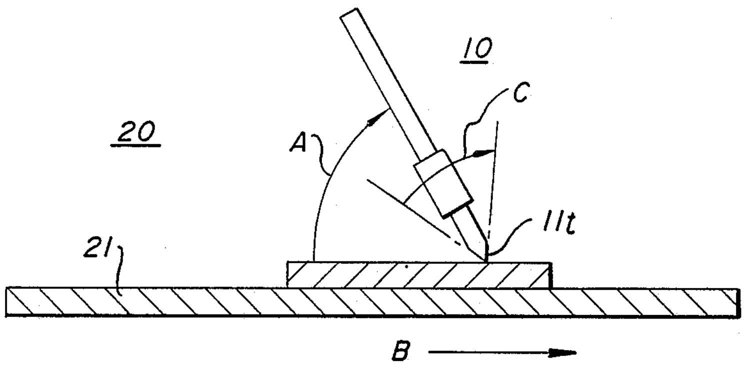
FIG. 2 is a side view of an illustrative scribing platform employed in connection with the heated tip of FIG. 1.

As seen in FIG. 2, the device 10 with a non-cutting heated tip is mounted in relation to a movable platform 21 at a fixed angle A less than 90 degrees to form the overall scribing machine 20 of FIG. 2. During the scribing operation, the platform 21 is moved in the direction indicated by the arrow B while the laminate 16 is maintained in contact with the tip 10. The included angle C of the tip is between about 25 and 30 degrees. In addition, the radius of the tip is initially between about 0.0020 and 0.0025 inches.

The machine 20 is provided with an atmosphere that depends upon the effect to be achieved. Where the scribing is to oxidize the patterns formed on the surface 15, the atmosphere contains oxygen. To promote oxidation, the oxygen content is increased above the percentage found in air. Where no oxidation is to take place, the atmosphere is inert, i.e. no oxygen is present.

When the surface 15 is metallic, the tip 10 is heated above the softening temperature of the metal. In the case of aluminum, this is above about 250° C. and the aluminum is rapidly and sufficiently softened to permit quick and reliable scribes without damaging the underlying layers of the laminate 16. Because the heating of the tip 10 permits rapid separation of the surface layers, there is little time for the transfer of heat laterally. In addition, the separation takes place rapidly because the aluminum layer is comparatively thin, being on the order of a few thousand Angstroms in thickness. There is the further fact that the ordinary substrate for the laminate 16 is a poor heat conductor such as glass and the limited lateral conduction prevents any undesired heating of the amorphous silicon that extends between separations in the aluminum surface. For this purpose, the lateral heating of the amorphous silicon is held to levels below about 200° C. and 300° C. where degradation in photovoltaic performance of amorphous silicon can take place.

In addition, because of the avoidance of undesired heating effects, there is simultaneous avoidance of metal alloying to underlying layers, as well as difusion into the underlying layers or within layers.

The tip **11*t* is desirably of osmium, sapphire, or Schaeffer alloys. Osmium is a metallic element of the platinum group; sapphire is a transparent corundum (aluminum oxide) and Schaeffer alloy is primarily Ruthenium. High speed and carbon steels are not satisfactory. After initial formation with a radius in the range from about 0.0020 to 0.0025 inches, the tip is flattened by221** abrasion, with tin oxide for example, to a working radius of about 0.0040 inches.

Figure 3:
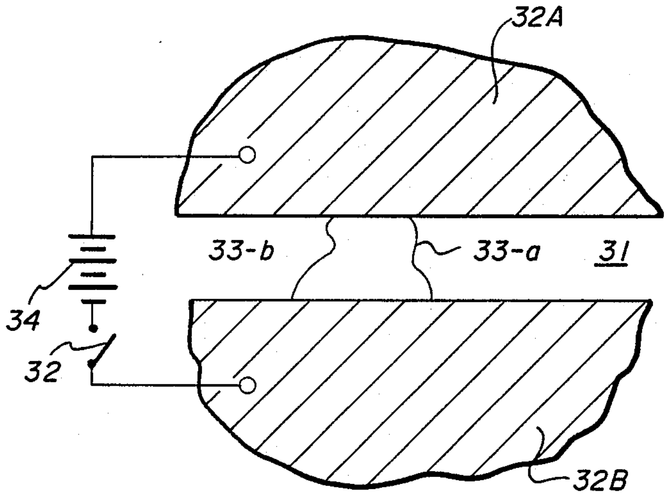
FIG. 3 is a plan view illustrating the burn-out of residual shards that can remain after preliminary scribing in accordance with the invention.

In those cases where filamentary strands of material remain as interconnections between adjoining scribed sections, the invention provides for the elimination of the filamentary strands or shards in accordance with FIG. 3. As shown in FIG. 3, a scribed path 31 extends between adjoining scribed metallic sections 32A and 32B. Because of incomplete scribing, two metallic filaments or shards **33-*a* and 33-*b* are shown extending between the main section 32A and 32B**.

In accordance with the invention, the residual shards **33-*a* and 33-*b* are eliminated by the momentary application of a voltage from a battery 34 through a switch 32 to the sections 32A and 32B. When the switch 32 is momentarily closed, the current that flows in the circuit including the battery 34 causes a rapid burn-out of the shards 33-*a* and 33-*b* because of their high resistance. It is apparent that the operation is self-quenching because once the shards 33-*a* and 33-*b* have been burnt out, the battery 34** is restored to its open circuit condition. To protect the solar cells, the battery is connected to reverse bias the solar cells.

Other implementations and modifications of the invention will occur to those of ordinary skill in the art.

What is claimed is:

1. The method of patterning the surface of a conductive material which comprises the steps of (a) bringing a heated and rounded tip into contact with the surface of said material;

(b) moving said heated and rounded tip over said material in contact therewith in accordance with a prescribed pattern to produce a line of separation of said material along said surface; and (c) applying a momentary voltage to straddle said line of separation and eliminate any shards therealong.

2. The method of claim 1 wherein excess oxygen is used to promote oxidation of said material in the region of scribing.

3. The method of claim 1 wherein an inert or reducing atmosphere is used in order to prevent oxidation of said tip.

4. The method of claim 1 wherein said tip is intermittently heated during the patterning operation.

5. The method of claim 1 wherein said surface is moved relative to said tip in accordance with said prescribed pattern.

6. The method of claim 1 wherein said tip has longitudinal axis that forms an angle of less than 90 degrees relatived to said surface.

7. The method of patterning the surface of a material which comprises the steps of (a) bringing a heated and rounded tip into contact with the surface of the material; and (b) moving said heated and rounded tip over said material in contact therewith in accordance with a prescribed pattern to achieve a scribed line of separation of said material along said surface;

wherein pressure is applied to said heated tip and an increase in pressure is accompanied by a decrease in temperature.

8. The method of claim 7 wherein excess oxygen is used to promote oxidation of said material in the region of scribing.

9. The method of claim 7 wherein an inert or reducing atmosphere is used in order to prevent oxidation of said tip.

10. The method of claim 7 wherein said tip is intermittently heated during the patterning operation.

11. The method of claim 7 wherein said surface is moved relative to said tip in accordance with said prescribed pattern.

12. The method of claim 7 wherei said tip has longitudinal axis that forms an angle of less than 90 degrees relatived to said surface.

13. The method of patterning the surface of an aluminum conductive material overlying a semiconductor substrate which comprises the steps of:

(a) heating a non-cutting tip in a range from about 600° C. above the softening temperature of said conductive material;

(b) contacting said conductive material with said heated tip; and (c) moving said tip in contact with the surface of said conductive material over a prescribed pattern at a rate which limits lateral heating effects.

14. The method of claim 13 wherein the patterning of said material produces substantially separated surface areas, and electrical energy is applied to and between said substantially separated surface areas to eliminate unseparated strands therebetween.

15. The method the claim 13 wherein the material is a conductor overlying hydrogenated amorphous silicon.

16. The method of claim 13 including the step of rounding said tip using a tin oxide abrasive.

* * * * *